United States Patent
Shiokawa et al.

(10) Patent No.: US 8,265,452 B2
(45) Date of Patent: Sep. 11, 2012

(54) RECORDING APPARATUS AND METHOD FOR RECORDING A PROGRAM AND MANAGEMENT INFORMATION

(75) Inventors: Junji Shiokawa, Chigasaki (JP); Hiroo Okamoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1122 days.

(21) Appl. No.: 11/896,615

(22) Filed: Sep. 4, 2007

(65) Prior Publication Data

US 2008/0138038 A1   Jun. 12, 2008

(30) Foreign Application Priority Data

Dec. 6, 2006   (JP) .................................. 2006-328940

(51) Int. Cl.
*H04N 9/80* (2006.01)
(52) U.S. Cl. ........................ 386/241; 386/248
(58) Field of Classification Search .................. None
See application file for complete search history.

(56) References Cited

U.S. PATENT DOCUMENTS

| | | | |
|---|---|---|---|
| 6,453,116 B1 | 9/2002 | Ando et al. | |
| 7,106,946 B1 | 9/2006 | Kato | |
| 7,437,055 B2 * | 10/2008 | Hamada et al. | 386/241 |
| 2002/0135608 A1 * | 9/2002 | Hamada et al. | 345/723 |
| 2004/0264933 A1 | 12/2004 | Uno | |
| 2005/0008330 A1 * | 1/2005 | Uno | 386/52 |
| 2005/0213481 A1 | 9/2005 | Ando et al. | |
| 2005/0254363 A1 | 11/2005 | Hamada et al. | |
| 2005/0259173 A1 * | 11/2005 | Nakajima et al. | 348/333.12 |
| 2006/0045466 A1 * | 3/2006 | Sasaki et al. | 386/52 |
| 2006/0171674 A1 | 8/2006 | Yoshida et al. | |
| 2006/0197848 A1 * | 9/2006 | Ogawa | 348/231.3 |
| 2006/0233083 A1 | 10/2006 | Tsumagari et al. | |
| 2007/0053654 A1 * | 3/2007 | Kikuchi et al. | 386/46 |
| 2007/0168867 A1 | 7/2007 | Hiroi et al. | |
| 2008/0138036 A1 | 6/2008 | Shiokawa et al. | |
| 2008/0138037 A1 | 6/2008 | Shiokawa et al. | |

FOREIGN PATENT DOCUMENTS

| | | |
|---|---|---|
| EP | 0 884 891 A2 | 12/1998 |
| EP | 1 280 348 A1 | 1/2003 |
| EP | 1 329 892 A2 | 7/2003 |
| EP | 1 596 396 A1 | 5/2004 |
| EP | 1 530 214 A1 | 5/2005 |
| EP | 1 569 449 A2 | 8/2005 |
| EP | 1 763 033 A1 | 3/2007 |
| JP | 2000-152180 | 5/2000 |
| JP | 2001-101840 | 4/2001 |

(Continued)

OTHER PUBLICATIONS

European Search Report issued in European Patent Application No. 07253473.8-2223 dated on Feb. 11, 2008.

(Continued)

*Primary Examiner* — William C Vaughn, Jr.
*Assistant Examiner* — Gelek W Topgyal
(74) *Attorney, Agent, or Firm* — McDermott Will & Emery LLP

(57) ABSTRACT

As a method of quickly displaying a thumbnail for navigation display of an AV stream, it is necessary to associate the AV stream with a thumbnail file when recording the thumbnail file separately from the AV stream file. The association, therefore, is performed by use of a serial number of the recorded AV stream file as a name of the related thumbnail file.

2 Claims, 16 Drawing Sheets

FOREIGN PATENT DOCUMENTS

| | | |
|---|---|---|
| JP | 2004-171311 | 6/2004 |
| JP | 2004-328450 | 11/2004 |
| JP | 2004-350042 | 12/2004 |
| JP | 2005-033383 | 2/2005 |
| JP | 2006-012248 | 1/2006 |
| JP | 2006-080723 | 3/2006 |
| JP | 2006-185523 | 7/2006 |
| KR | 10-1999-0006778 | 1/1999 |
| KR | 100301007 B1 | 11/1999 |
| KR | 2000-025848 | 5/2000 |
| WO | WO 2006-075842 A1 | 7/2006 |

OTHER PUBLICATIONS

Korean Office Action, issued in Korean Patent Application No. KR 10-2007-0101567 dated on Oct. 30, 2008.

Japanese Office Action issued in Japanese Patent Application No. 2006-328940. dated Jan. 4, 2011.

Korean Office Action, with English translation, issued in Korean Patent Application No. 10-2007-101567, mailed May 29, 2009.

Korean Office Action issued in Korean Patent Application No. 10-2007-0101559, mailed Jan. 19, 2010.

Japanese Office Action issued in Japanese Patent Application No. JP 2006-328941 dated Jan. 4, 2011.

European Search Report issued in European Patent Application No. 07253472.0-2223 dated on Feb. 28, 2008.

European Search Report issued in European Patent Application No. 07253478.7 dated on Jun. 26, 2008.

Japanese Office Action issued in Japanese Patent Application No. 2006-328943 dated Jan. 4, 2011.

U.S. Office Action issued in U.S. Appl. No. 11/896,614 dated Apr. 15, 2011.

U.S. Office Action issued in U.S. Appl. No. 11/896,613 dated Apr. 13, 2011.

* cited by examiner

RECORDING APPARATUS AND METHOD FOR RECORDING A PROGRAM AND MANAGEMENT INFORMATION

CLAIMS OF PRIORITY

The present application claims priority from Japanese application serial no. 2006-328940, filed on Dec. 6, 2006, the content of which is hereby incorporated by reference into this application.

BACKGROUND OF THE INVENTION

The present invention relates to a recording and playback apparatus which writes and reads data to and from a recording medium.

JP-A-2000-152180 and JP-A-2001-101840 each disclose a technique related to this technical field.

JP-A-2000-152180 describes a subject "To realize video editing on a single recording medium without overwriting existing video data recorded on a recording medium, and the use of solving means "An optical disc includes an AV file which records a plurality of pieces of AV data and an RTRW management file which records a plurality of pieces of PGC information specifying a plurality of partial zones within the AV data. There are two different types of PGC information: an original type and a user-defined type. With the PGC information of the user-defined type, each pieces of cell information specifies a partial zone in the AV data selected as a material for editing. The order of arrangement denotes the playback order temporality determined depending on video editing operations."

JP-A-2001-101840 describes a subject "Videos in a video cassette tape can be watched after mounting it in a player and then playing it back. Since the same operation is necessary both when watching all Videos and when checking the contents, it takes considerable time to find a target video from a number of video cassette tapes" and the use of solving means "A representative still image is generated for each video unit. Only these still images are collectively recorded, as management data different from a video stream, on a medium that records the above-mentioned video stream or a high-speed accessible medium one-to-one corresponding to the above-mentioned medium. Then, the management data is read at high speed and displayed to provide the user with overview of the entire video stream."

SUMMARY OF THE INVENTION

With the advancement of high-efficiency coding technologies, AV data including video and audio data can be compressed and recorded in real time as digital data on a hard disk, optical disc, and other recordable mass-storage media. Furthermore, a recording and playback apparatus having any of these recording media makes it possible to record digital data compressed with a coding method, inputted from external through broadcasting and communication, on a recording medium as it is.

These recording and playback apparatuses generate management information for managing digital data to be recorded and record this information on the same recording medium together with the digital data. When a rewritable recording medium is used, the user can perform editing operations on a recording and playback apparatus by generating and operating a list (hereafter referred to as playlist) which indicates the playback order by updating the above-mentioned management information. Specifically, a playlist indicates the playback order by combining AV data portions. An example management condition of AV data on a recording medium according to the above-mentioned conventional technology is shown in FIG. 2.

Reference numeral 201 denotes AV data on the recording medium when there exist programs #1 to #3 (corresponding to a single program, for example, when a recorder for recording broadcast programs has recorded one program) as a recording unit. Reference numeral 202 denotes a second management layer (management level 2) in the management information, and original cell information #1 to #3 respectively denote all playback ranges of program units, i.e., programs #1 to #3. Furthermore, user-defined cell information #1 and #2 denote whole or part (for example, a user-specified portion of one program in the above-mentioned recorder) of playback ranges of programs specified by the user. The number of pieces of user-defined cell information depends on editing operations by the user. Reference numeral 203 denotes a first management layer (management level 1) of the management information. Program set information includes the original cell information #1 to #3. The user can play back whole AV data recorded on the recording medium by reading data based on the program set information. Furthermore, playlist information #1 to #k denote the playback order of the above-mentioned user-defined cell information specified by the user. There may be a plurality of pieces of playlist information. Information enclosed in a frame 204 is original information used to manage the entire AV data in the management information, and information enclosed in a frame 205 is user-defined information used to manage playlists through editing operations by the user.

In FIG. 2, since the playlist information is managed as management level 1 equivalently as the program set information, the order of a plurality of pieces of playlist information is determined uniquely. This is a reason why it has been impossible to change the display order of a list of playlists on the user interface. From the viewpoint of ease of use, it is desirable that a recording method and an apparatus allow the user to arbitrarily rearrange the display order of playlists on the user interface.

Furthermore, the conventional case did not take into consideration a point that a plurality of users generate and selectively manage desired playlist information.

Furthermore, in connection with Resume Playback for suspending playback of a program and then restarting playback of the suspended program from a suspended portion (resume point), JP-A-2000-152180 described above did not take into consideration a point that Resume Playback control can be performed according to the playback condition at the stop time of playback, for example, when a playlist or program is played back.

Furthermore, since an optical disc is used as a recording medium, originally having low speed of switching between read and write operations, the optical disc was not taken into consideration as a recording format for a case when playback operation was performed while writing information.

Furthermore, in the case of Navigation Display for displaying program contents in the recording medium as a list of reduced images (hereafter referred to as thumbnail), it is necessary to extend a compressed image of an actual program, reduce it to the size of thumbnail, arrange it on the navigation screen, and repeat this processing to display a thumbnail. Therefore, no consideration was made from the viewpoint of Navigation Display at high speed.

Furthermore, in JP-A-2001-101840, even if a plurality of program contents exists on a recording medium, a plurality of thumbnails for each program content was recorded in one file.

(Refer to FIG. 4, FIG. 7, etc. of JP-A-2001-101840.) Specifically, in FIG. 4 of JP-A-2001-101840, a plurality of thumbnails 1 to 3 are recorded as a single file ThumbNail.dat70040. In this case, in order to delete any of the plurality of thumbnails, for example, it is necessary to once open ThumbNail.dat70040, delete unnecessary thumbnails, and then save ThumbNail.dat70040. Thus, if ThumbNail.dat70040 has been partially deleted as a result of editing, other thumbnails are rearranged so that an empty area produced by the deleted thumbnails be filled, and then each program content is also rearranged accordingly. Specifically, for the capacity of deleted information, other thumbnails, program contents, and other information will be moved on the recording medium. In rearrangement of information accompanying such deletion of thumbnails, processing time increases with increasing capacity of the recording medium. In particular, it is assumed that the processing time remarkably increases with iVDR (registered trademark, for example, 250 GB or more) having larger capacity than the present DVD (4.7 GB).

The present invention was embodied taking the above-mentioned viewpoints into consideration, and an object thereof is to improve ease of use of a recording and playback apparatus.

An overview of a certain aspect of the present invention will be described below.

In order to accomplish the above-mentioned object, a management unit and an upper management layer for managing all pieces of playlist information registered is added, and the management unit is configured so as to be handled equivalently as the integrated information that indicates all playback ranges of AV data. Furthermore, the added management layer is configured so as to handle user-defined integrated information in which any desired playback range included in a lower layer can be registered.

Furthermore, in order to suspend playback of a program and then restart playback thereof from a suspended portion, Resume Playback control is enabled according to the playback condition at the stop time of playback, by independently retaining positions at which playback was stopped, such as a resume point for playing back a playlist, a resume point for playing back a program, a resume point according to the operating condition of the playback apparatus, etc., on a medium as management information.

Furthermore, in order to enable playback and other operations while recording using a high-speed hard disk drive as a recording medium, a read/write unit is configured so as to allocate a predetermined quantity of units for recording or playing back a program stream.

Furthermore, in order to improve the speed of Navigation Display, a thumbnail for Navigation Display is generated in advance and then recorded on the recording medium in relationship to a program.

Details on claimed pieces of invention of the present invention are as described by the claims appended herein.

DESCRIPTION OF THE PREFERRED EMBODIMENT

Embodiments of the present invention will be explained below with reference to the accompanying drawings.

Figure 1:
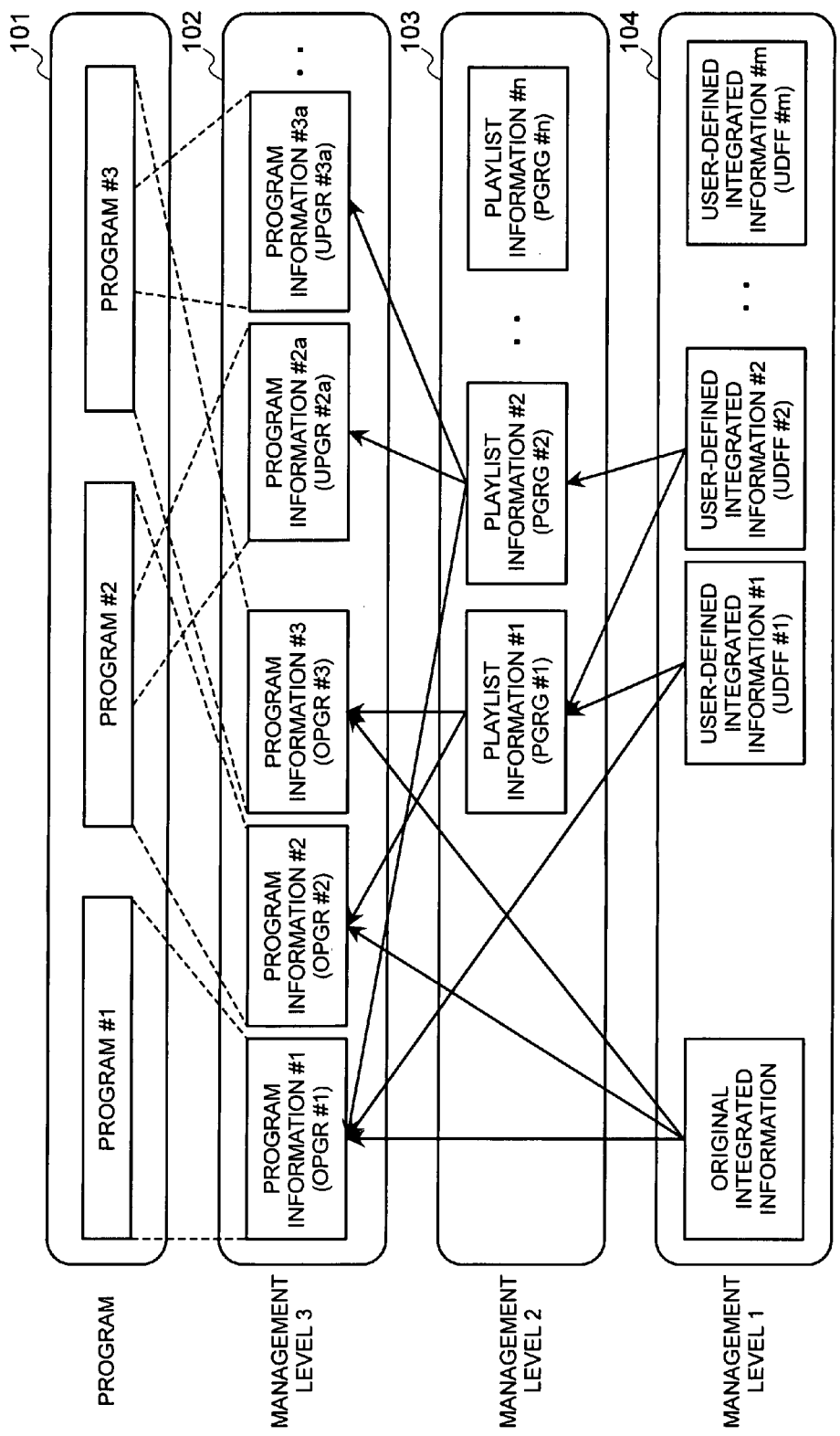
FIG. 1 is a diagram showing a management condition of AV data in a recording and playback apparatus according to the present invention.

FIG. 1 is a diagram showing a management condition of AV data on a recording medium in a recording and playback apparatus according to the present embodiment. Like reference numeral 201 of FIG. 2, reference numeral 101 denotes AV data on the recording medium when there exist programs #1 to #3 as recording units.

Figure 2:
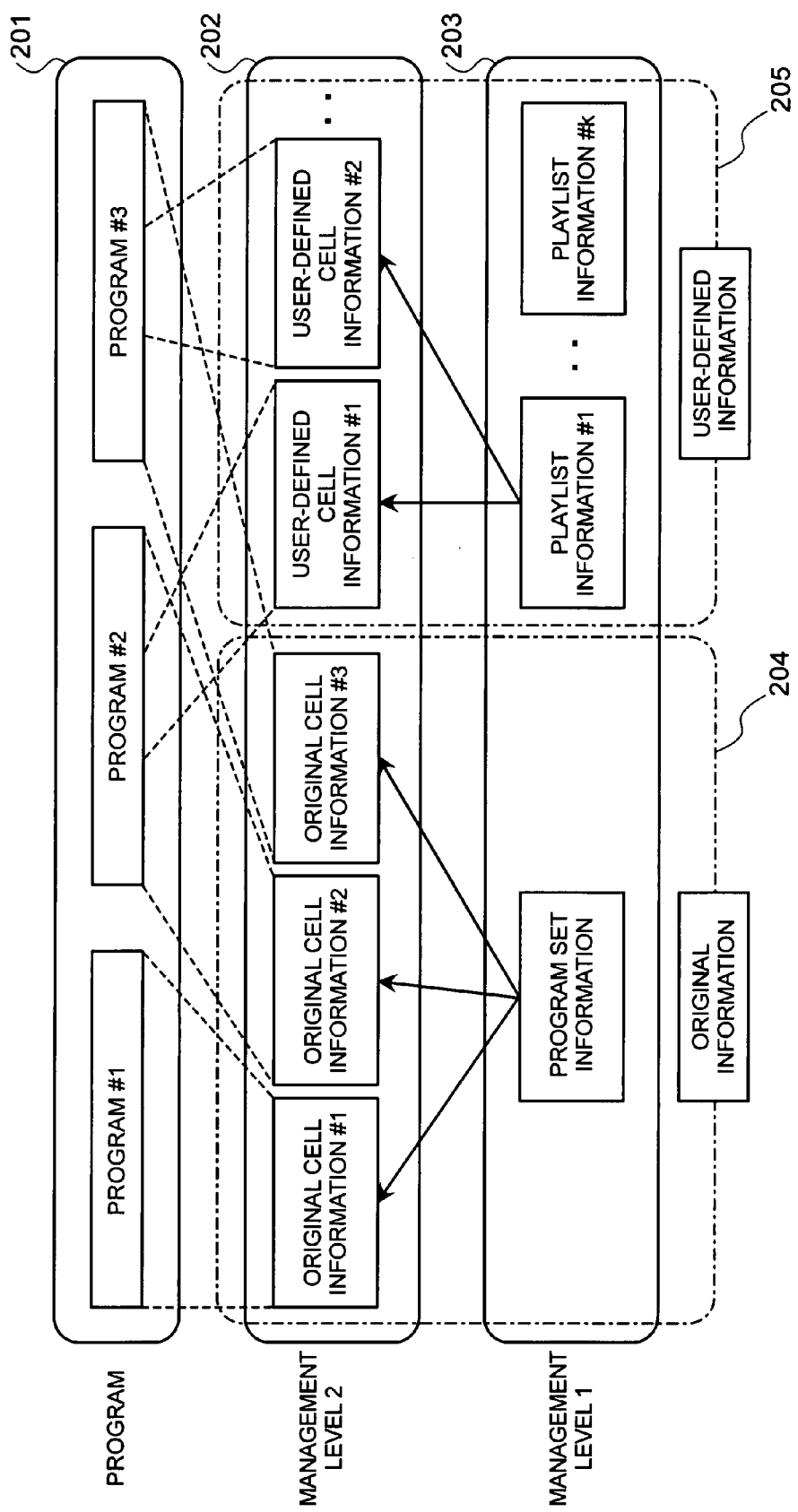
FIG. 2 is a diagram showing a management condition of AV data according to a conventional case.

Reference numeral 102, equivalent to 202 of FIG. 2, denotes a third management layer (management level 3) in management information. Program information #1 to program information #3 respectively denote all playback ranges of program units, i.e., program #1 to program #3 (Hereafter program information forming a pair with these program entities is referred to as "original program information" which is denoted as "OPGR #1" in FIG. 1). Furthermore, program information #2a to #3a denote whole or part of a playback range of a program specified by the user (Hereafter these pieces of information are referred to as "user-defined program information" which is denoted as "UPGR #2a" in FIG. 1). Here, a part of program #2 and a part of program #3 are shown. At portions corresponding to program information #1 to #3, the number of pieces of information changes with addition or deletion of AV data, i.e., an increase or decrease in the number of programs. Furthermore, at portions corresponding to program information #2a and #3a, the number of pieces of information changes with editing operations by the user.

Reference numeral 103, corresponding to management level 1 of FIG. 2, denotes the second management layer (management level 2) of the management information and includes only playlist information #1 to #n. Each piece of playlist information indicates the playback order of any desired program information in the management level 3. There may be a plurality of pieces of playlist information.

The present embodiment is characterized by reference numeral 104, a first management layer (management level 1) of management information, which has been added as a new level including a plurality of pieces of integrated information. The original integrated information is integrated information that includes system resume information, etc., which will be mentioned in detail later. User-defined integrated information #1 to #m include one or a plurality of any desired pieces of playlist information in the management level 2 and program information in the management level 3. For example, when a single recording medium is shared by a plurality of users, it is possible to manage the contents to be played back that suit the preference of each user by use of one piece of user-defined integrated information for each user.

The embodiment of the recording and playback apparatus according to the present invention will be explained more specifically with reference to another drawing.

Figure 3:
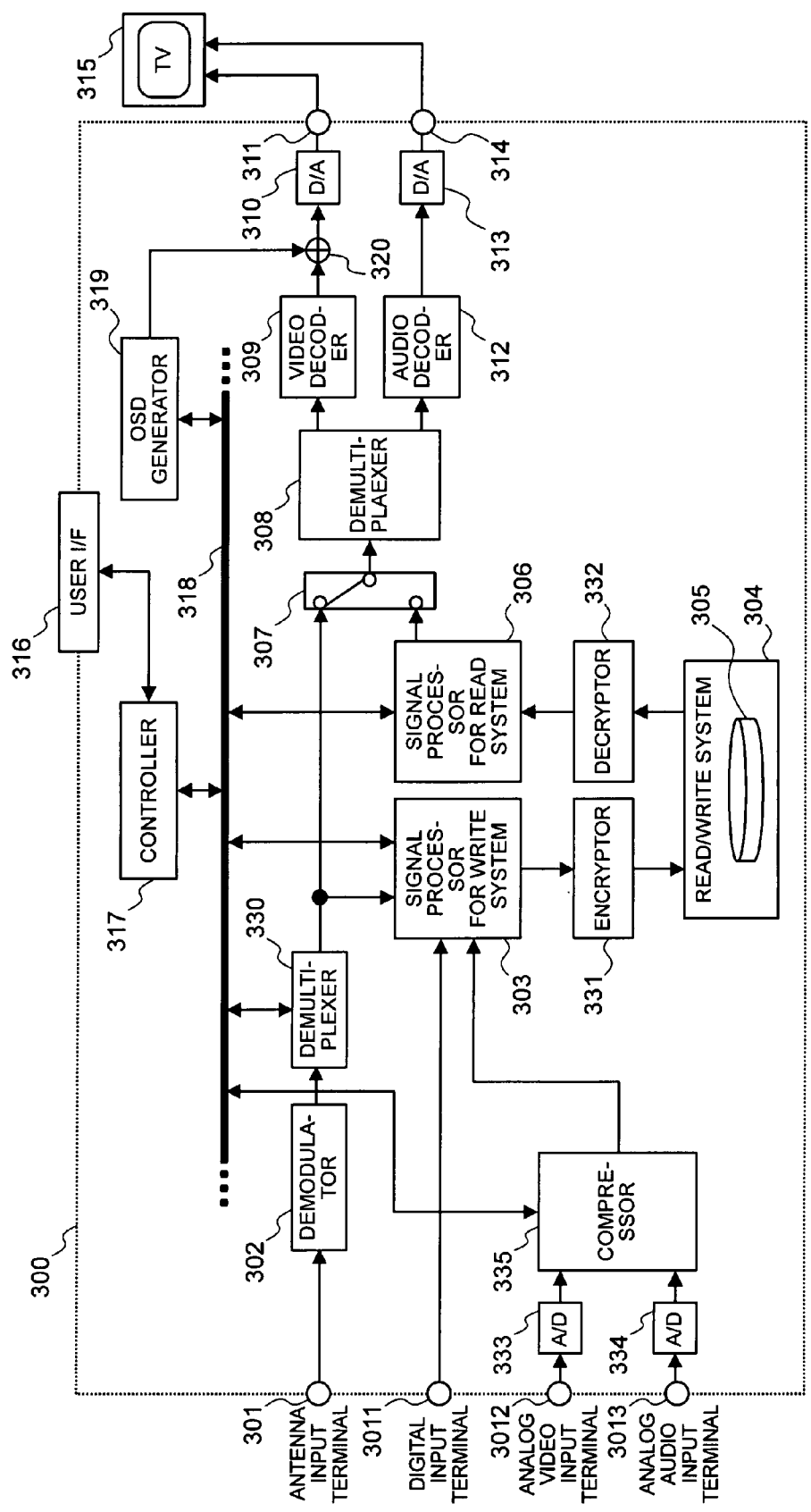
FIG. 3 is a block diagram showing a recording and playback apparatus according to the present invention.

FIG. 3 is a block diagram showing an example recording and playback apparatus according to the present embodiment, which makes it possible to receive digital broadcasting, record data on a recording medium, play back recorded data, and obtain playback output. The recording and playback apparatus 300 includes the input terminal 301, an input terminal 3011, an analog video input terminal 3012, and an analog audio input terminal 3013. The input terminal 301 inputs a waveform received from an antenna. The input terminal 3011 inputs compressed video/audio data from other apparatus. The analog video input terminal 3012 inputs an analog video signal. The analog audio input terminal 3013 inputs an analog audio signal. Further, the recording and playback apparatus 300 includes an analog-to-digital (A/D) converters 333 and 334, a demodulator 302, a demultiplexer 330, a compressor 335, a write system signal processor 303, an encryptor 331, a read and write system 304, a recording medium 305, and a decryptor 332. The analog-to-digital (A/D) converters 333 and 334 convert an analog signal into a digital signal. The demultiplexer 330 demultiplexes a demodulated digital signal into audio, video, and other data. The compressor 335 compresses the digitized video and audio signals. The encryptor 331 encrypts data to be recorded. The read and write system 304 includes a function to drive the recording medium. The decryptor 332 decrypts encrypted data recorded on the recording medium. Further, the recording and playback apparatus 300 includes a read system signal processor 306, a selector 307, a demultiplexer 308, a video decoder 309, a digital-to-analog (D/A) converter 310, a video output terminal 311, an audio decoder 312, a D/A converter 313, an audio output terminal 314, a TV set 315, a user I/F 316, a controller 317, a system bus 318, an OSD generator 319, and an adder 320.

At the time of recording, a signal transmitted by a broadcasting station through digital broadcasting and then received by the present recording and playback apparatus is demodulated based on a predetermined demodulation mode by the demodulator 302, undergone necessary signal processing such as addition of data for timing adjustment and modulation by the write system signal processor 303, encrypted by the encryptor 331, and recorded on the recording medium 305 by the read and write system 304. Furthermore, a digital signal inputted from the digital input terminal 3011 is undergone necessary signal processing such as addition of data for timing adjustment and modulation by the write system signal processor 303, encrypted by the encryptor 331, and recorded on the recording medium 305 by the read and write system 304. Furthermore, an analog video signal inputted from the analog video input terminal 3012 and an analog audio signal inputted from the analog audio input terminal 3013 are undergone compression processing by the compressor 335, encrypted by the encryptor 331 through the write system signal processor 303, and recorded on the recording medium 305 by the read and write system 304.

At the time of playback, an encrypted digital data read from the recording medium 305 through the read and write system 304 according to user's direction is decrypted by the decryptor 332, undergone demodulation based on a predetermined demodulation mode and other signal processing necessary for playback by the read system signal processor 103, and sent to the demultiplexer 308 through the selector 307. The digital data is undergone predetermined video decoding processing by the video decoder 309, converted into an analog signal by the D/A converter 310, and sent to the monitor output of the TV set 315 for display through the video output terminal 311. Furthermore, the digital data is undergone predetermined audio decoding processing by the audio decoder 312, converted into an analog signal by the D/A converter 313, and outputted by an audio output mechanism of the TV set 315 through the audio output terminal 314.

The controller 317 controls each section of the recording and playback apparatus 300 through the system bus 318, and controls the entire apparatus so that the apparatus performs operations based on user's directions inputted through the user I/F 316. A request for a direction input by the user or a necessary OSD display to the user are prepared by the OSD generator 319, added to the output of the video decoder 309 at a suitable level by the adder 320, and finally outputted to the monitor screen of the TV set 315.

As a specific example of the use of the management information configuration of FIG. 1, the following describes a case when each piece of integrated information at management level 1 is used for a menu display of record data.

Figure 4:
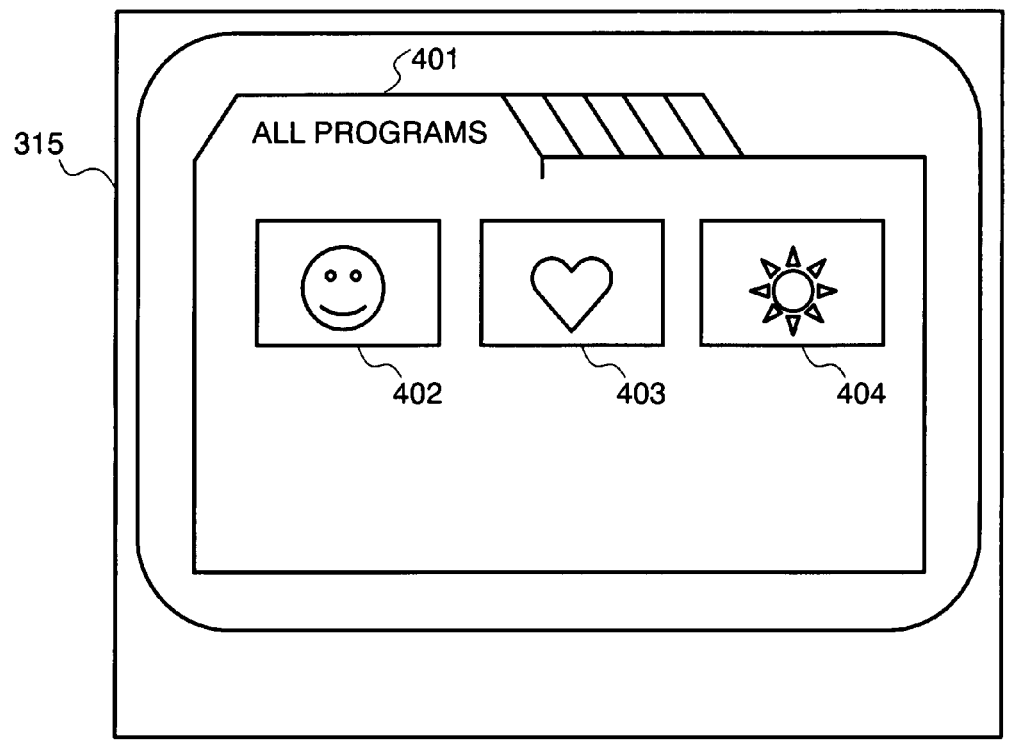
FIG. 4 is an example display output of original integrated information.

FIG. 4 is an example of the menu display using the original integrated information of FIG. 1. Reference numeral 315 denotes the TV set of FIG. 3; 401, a tag for displaying all programs; 402, a thumbnail indicating program information #1; 403, a thumbnail indicating program information #2; and 404, a thumbnail indicating program information #3. By moving the cursor position on the screen to any desired thumbnail and then selecting it through a remote control, etc., the user can play back any desired program or all programs.

Figure 5:
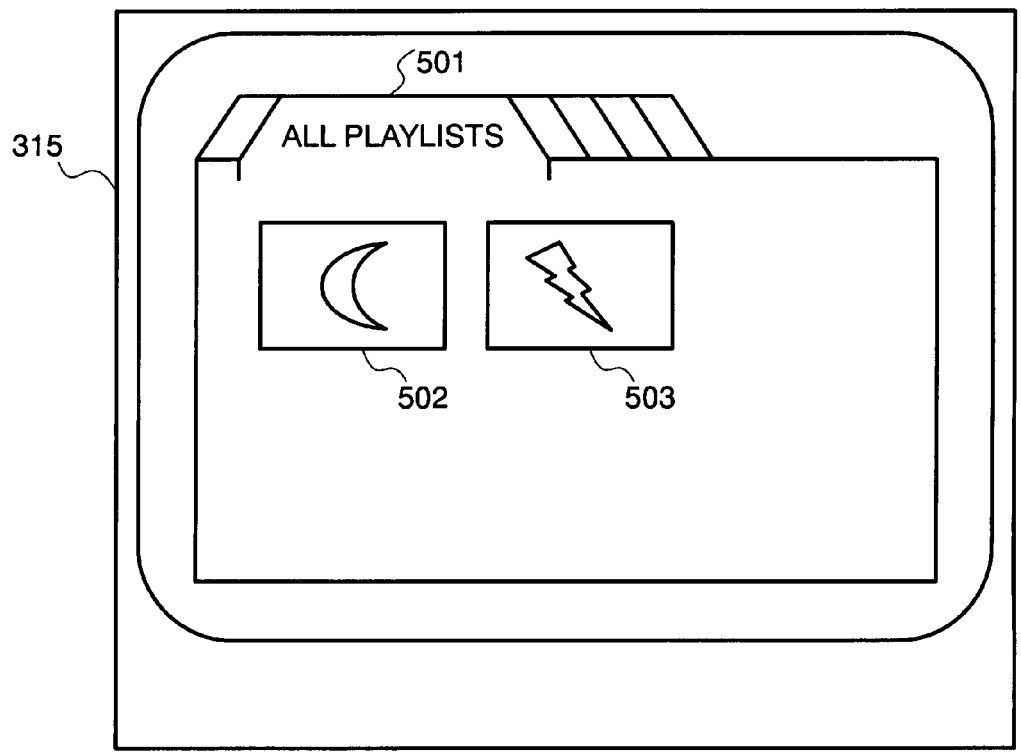
FIG. 5 is an example display output of user-defined integrated information as a list of playlists.

FIG. 5 is an example of the menu display using one of some pieces of user-defined integrated information of FIG. 1 as a playlist. Reference numeral 501 denotes a tag for displaying all playlists; 502, a thumbnail indicating playlist information #1; 503, a thumbnail indicating playlist information #2. Like the above-mentioned case, by moving the cursor position on the screen to any desired thumbnail and then selecting it through a remote control etc., the user can play back any desired playlist or all playlists. Display switching from the above-mentioned tag for displaying all programs 401 to the above-mentioned tag for displaying all playlists 501 can be realized, for example, when the user moves the cursor at the tag character position.

Figure 6:
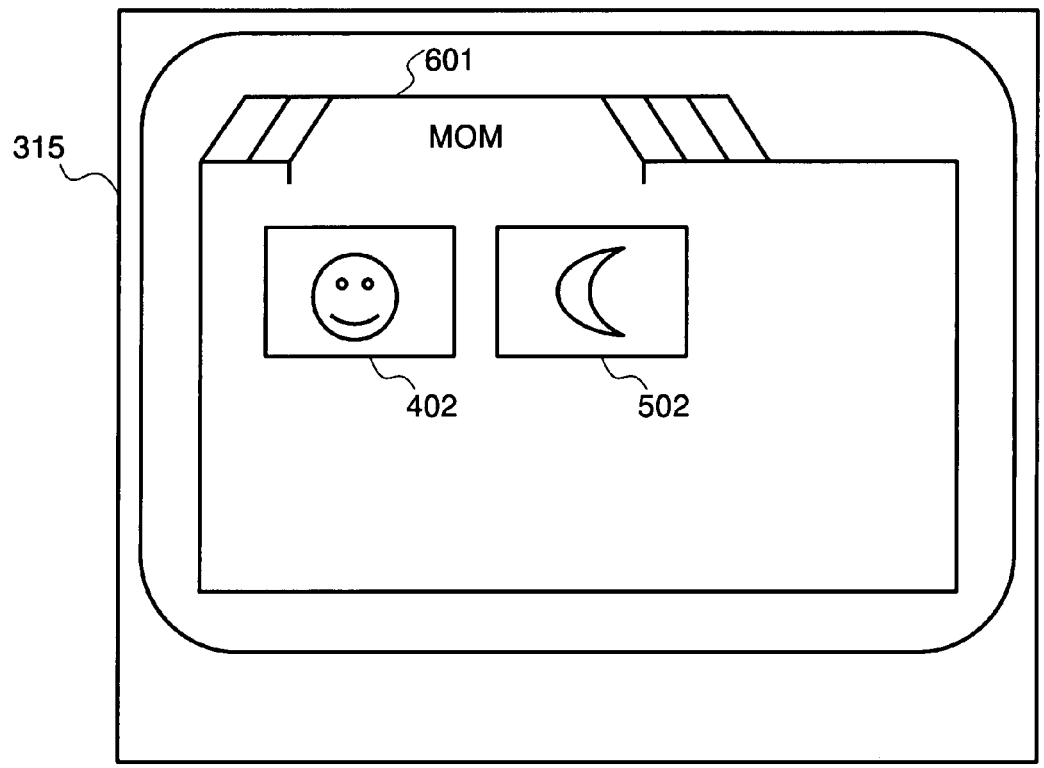
FIG. 6 is a first example display output of user-defined integrated information.

FIG. 6 is an example of the menu display using user-defined integrated information #1 of FIG. 1. Reference numeral 601 denotes a tag for the menu display for user #1 (here, "Mom"); and 402 and 502, thumbnails respectively indicating program information #1 and playlist information

1, as shown in FIG. 1. "Mom" can freely register and delete data to be played back using the tag for the menu display for Mom 601 as a folder dedicated for herself.

Figure 7:
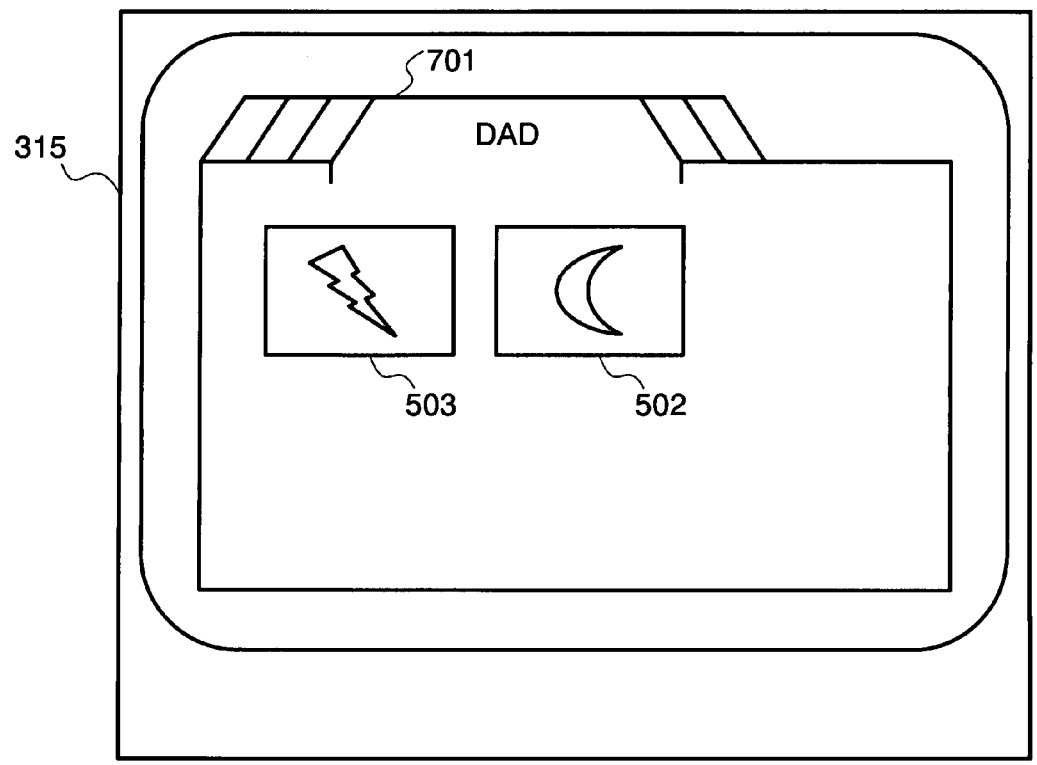
FIG. 7 is a second example display output of user-defined integrated information.

Likewise, FIG. 7 is an example of the menu display using user-defined integrated information #2 of FIG. 1. Reference numeral 701 denotes a tag for the menu display for user #2 (here, "Dad"); and 503 and 502, thumbnails respectively indicating playlist information #2 and #1, as shown in FIG. 1. In this case, "Dad" selects two playlists and can change the playback order thereof. Furthermore, like the above-mentioned case of "Mom", "Dad" can freely register and delete data to be played back using the tag for menu display for Dad 701 as a folder dedicated for himself.

As mentioned above, in accordance with the embodiment of the present invention, a management unit and an upper management layer for managing all pieces of playlist information registered have been added, and the management unit is configured so as to be handled equivalently as the integrated information that indicates all playback ranges of AV data. Furthermore, the added management layer is configured so as to handle user-defined integrated information in which any desired playback range included in a lower layer can be registered, thereby allowing the user to selectively manage any desired playlists or playback ranges.

Thus, when a single recording medium is shared by a plurality of users, it is possible to manage favorite contents to be played back for each user, improving the ease of use.

The above embodiment has mentioned a case when digital broadcasting is received and digital data recorded as it is, but not limited thereto. It may be possible that a network I/F is provided to obtain AV data from an external network or that a coding element is provided to record data on the recording medium while coding analog data. Specifically, the present embodiment refers only data management on the recording medium, but the input path is not limited thereto.

Figure 8:
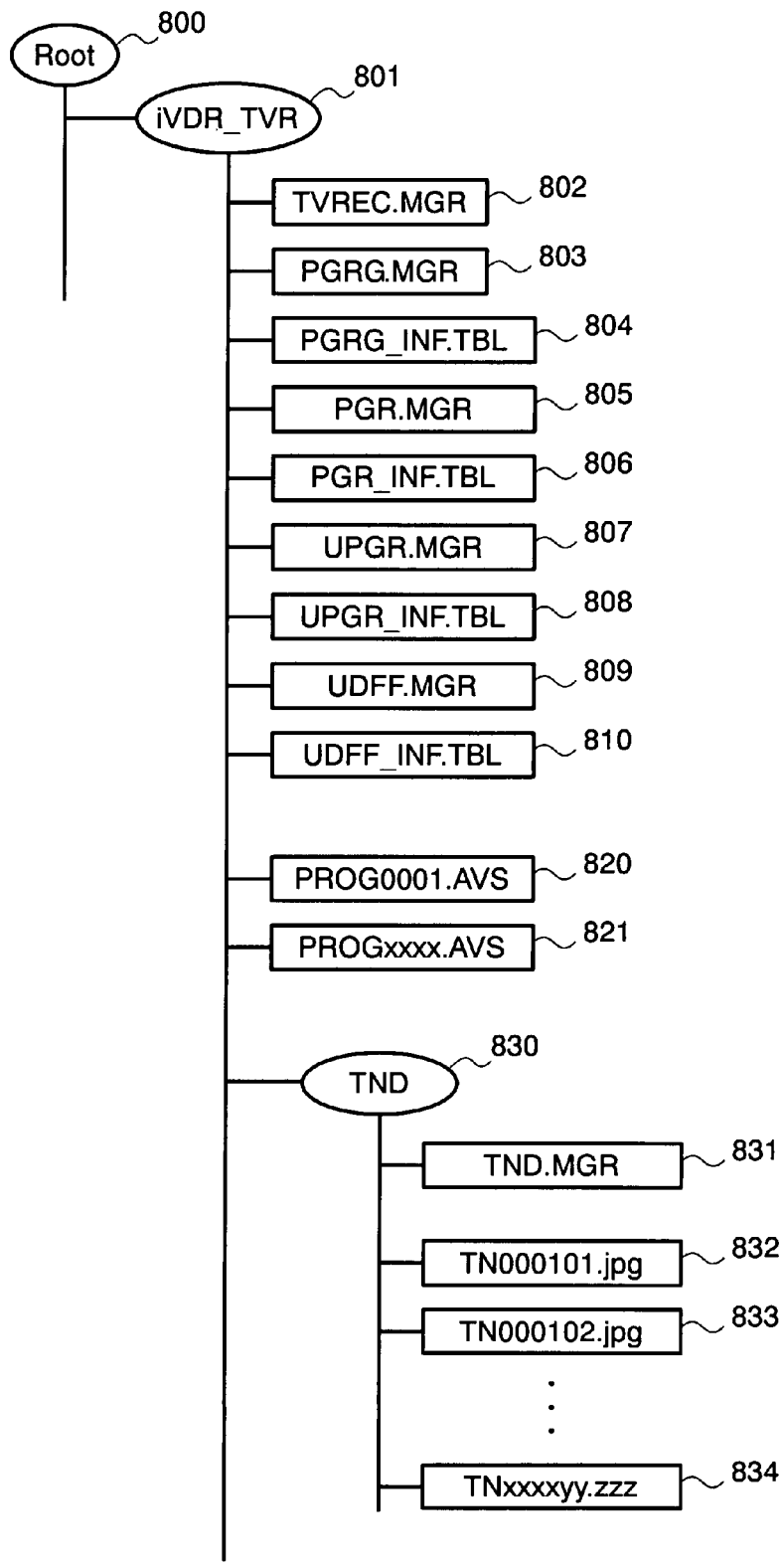
FIG. 8 is a diagram showing an example file structure including each piece of original integrated information, playlist integrated information, user-defined integrated information, playlist information, program information, AV data (programs), etc.

FIG. 8 shows an example file configuration with which the above-mentioned programs, program information, playlist information, original integrated information, and user-defined integrated information are actually recorded on the recording medium 305 (FIG. 3). The present recording medium is a medium for digital recording and playback. Each file on the medium is managed with the same file system as that used for management of recording media for personal computers. In FIG. 8, ROOT 800 denotes the most significant layer of the file directory, and iVDR_TVR801 (iVDR is a registered trademark) a lower directory thereof. FIG. 8 shows each file structure that realizes the management structure shown in FIG. 1 concerning the present invention. Management files, such as TVREC, MGR 802, PGRG.MGR 803, PGRG_INF.TBL 804, PGR.MGR 805, PGR_INF.TBL 806, UPGR.MGR 807, UPGR_INF.TBL808, UDFF.MGR 809, UDFF_INF.TBL810, etc., and video-audio multiplexed AV stream files PROG0001.AVS820, . . . , PROGxxxx.AVS 821 (xxxx of the AV stream file name is assigned a number which is incremented, for example, each time an AV stream is recorded.) are recorded under iVDR_TVR801 (iVDR is a registered trademark). Reference numeral 830 denotes a directory named TND under iVDR_TVR801 (iVDR is a registered trademark) which stores files related to thumbnails used for navigation list recorded on the recording medium. Reference numeral 831 denotes a thumbnail management file named TND.MGR which performs integrated management of thumbnail entity files 832, 833, . . . , 834. File name of an thumbnail entity file is TNxxxxyy.zzz, as shown in 834, where xxxx corresponds to xxxx of a program file 821 related to a thumbnail, yy is assigned a serial number registered as a thumbnail, and zzz denotes the data type, for example, bmp for non-compressed bit map or jpg for compressed JPEG (Joint Photographic Experts Group). In accordance with the present embodiment, thumbnail files corresponding to each program file are recorded as separate files like reference numerals 832 to 834. Recording a plurality of thumbnail files as separate files 832 to 834 in this manner, instead of integrating them into one file, makes it easier to add and delete thumbnail files. Particularly in the case of a mass-storage hard disk drive like iVDR (registered trademark), this file configuration makes it possible to reduce processing time for deleting and adding thumbnail files.

Figure 14:
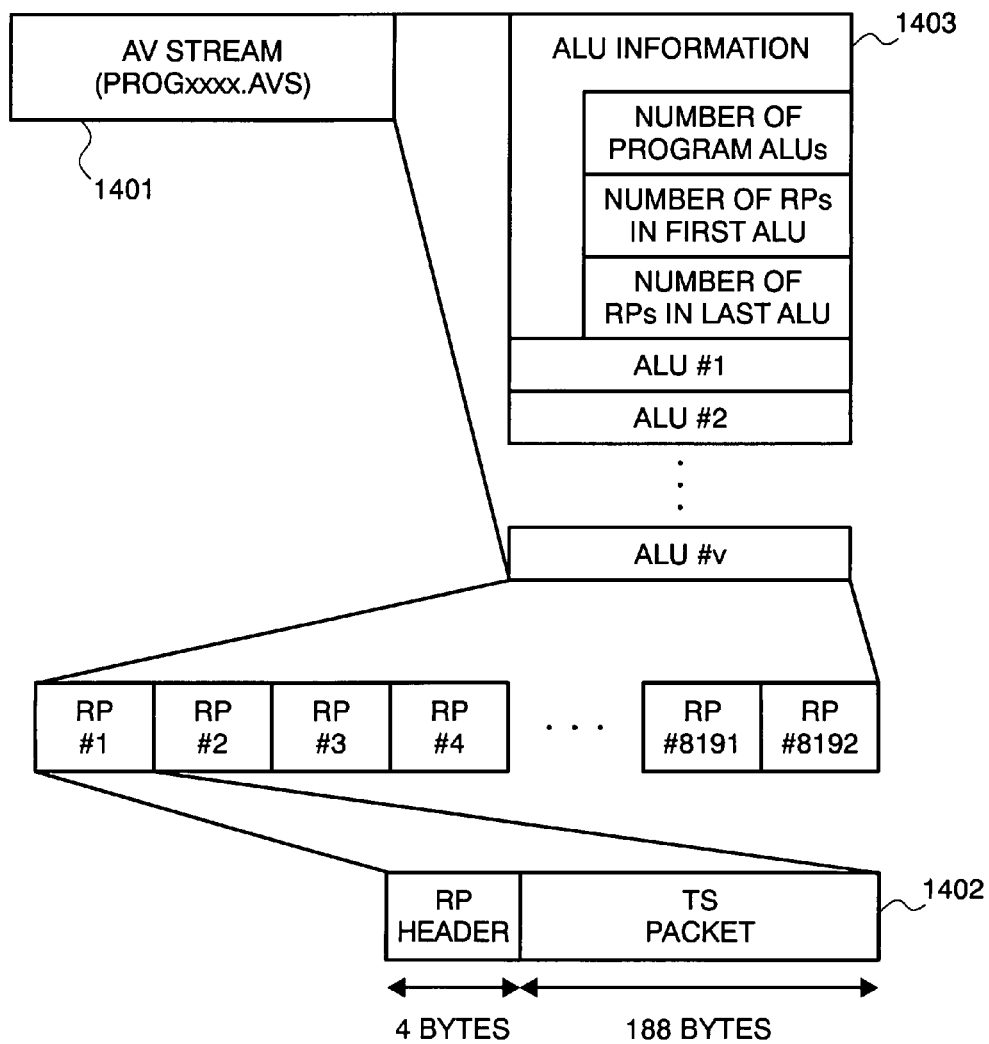
FIG. 14 is a diagram showing a packet configuration of an AV stream file.

AV stream files 820 (PROG0001.AVS) and 821 (PROGxxxx.AVS) of FIG. 8 are recorded in accordance with a file configuration shown in FIG. 14. In FIG. 14, reference numeral 1401 denotes an AV stream file and a minimum unit for recording an AV stream received through broadcast is referred to as ALU. Furthermore, if the AV stream has been encrypted, the ALU is also used as a minimum unit for encryption. An RP packet 1402, a unit for record packet, is a 192-byte data packet composed of a 188-byte transport packet of the MPEG (Moving Picture Expert Group) standard and a receive time stamp (4-byte count value upon reception, counted with 27 MHz) as a header. In accordance with the present embodiment, a total of 8192 192-byte RP packets 1402 constitute one ALU. An AV stream file 1401 records AV streams and ALU information 1403; the AV streams including ALU#1 to ALU#v (each including 8192 RPs) and the ALU information 1403 including the total number of ALUs in the recorded AV stream, the number of RPs in the first ALU, and the number of RPs in the last ALU. Since the number of RPs in the first and last ALUs in the AV stream may not be 8192 in some cases, the ALU information 1403 is used to record the number of RPs other than 8192 (mentioned in detail later).

Figure 9:
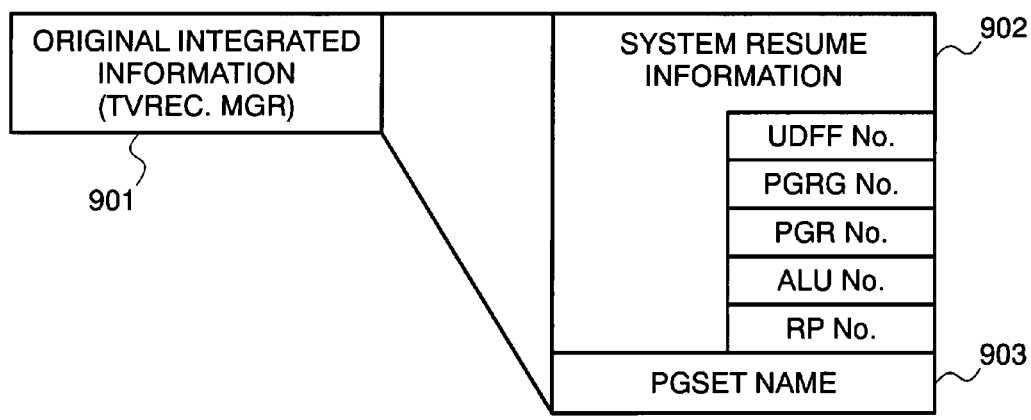
FIG. 9 is a diagram showing an example structure of a management table of each piece of original integrated information.

FIG. 9 shows a configuration of a management table in TVREC.MGR 802 (FIG. 8).

Original integrated information 901 records system resume information 902 and program integrated information name 903.

Figure 10:
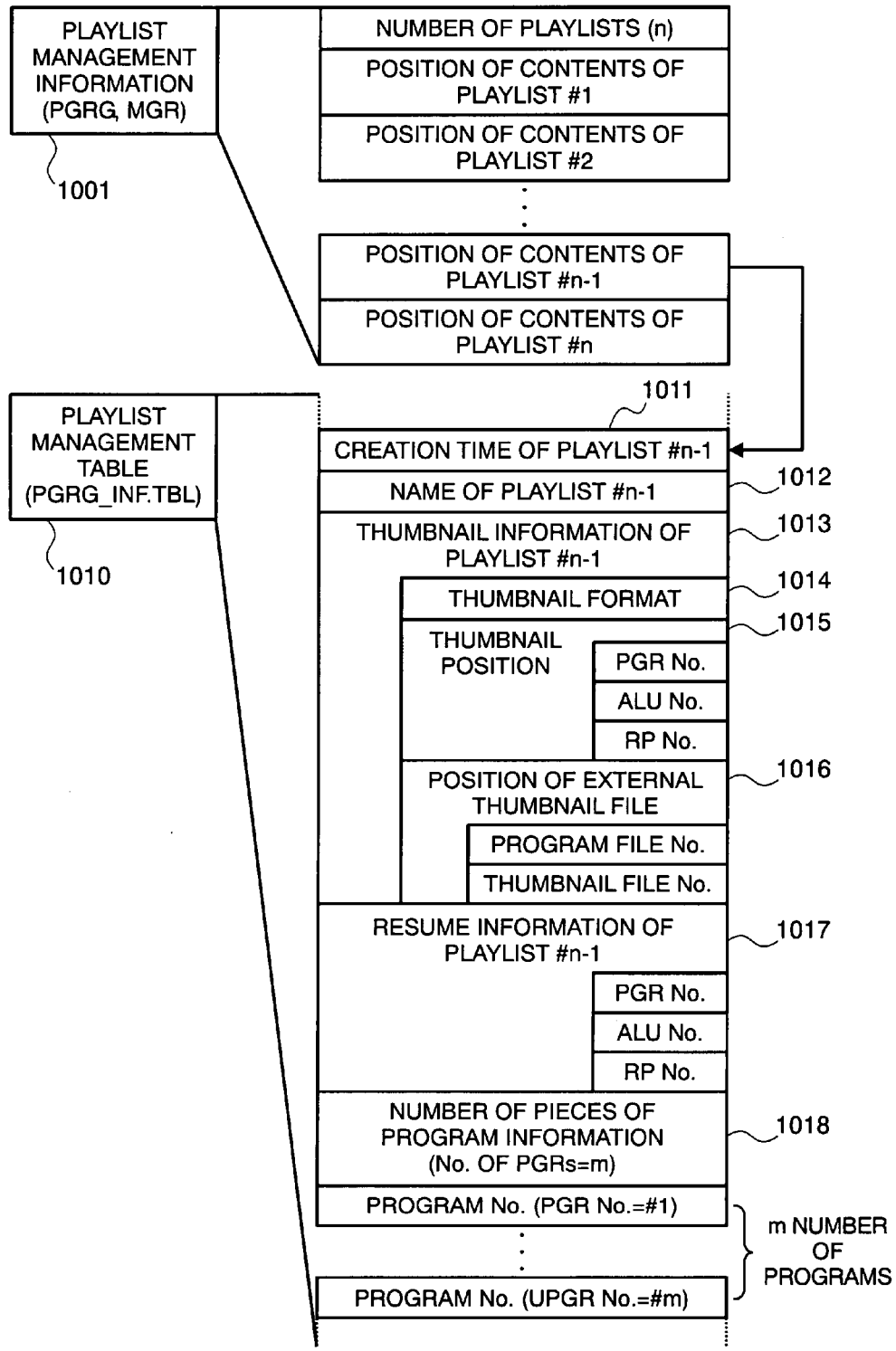
FIG. 10 is a diagram showing a configuration of playlist management information and an example management table.

Information recorded in the system resume information 902 includes: user-defined integrated information (UDFF) number when the user stops playback; playlist information (PGRG) number of the lower layer; original program information (OPGR) number of the lower layer or user-defined program information (UPGR) number (PGR); ALU number that is a minimum unit for recording AV stream mentioned later; and RP number in the record packet in the ALU in tabular form. The PGR number is used for judgment of OPGR or UPGR, for example, OPGR is judged with the PGR number (hexadecimal) from 0000 to 7FFF or UPGR is judged with the PGR number (hexadecimal) from 8000 to FFFF. Reference numeral 903 denotes a field for recording a name (PGSET name) given to the program integrated information, for example, a character string of a name assigned by the user to the contents group on the recording medium. The use of this field in this manner makes it possible to determine who is using the recording medium and record a name related to the contents group, providing an advantage that recorded contents become easier to grasp. FIG. 10 shows the contents of a playlist management information (PGRG) file 1001 and a playlist management table file 1010 which manage playlists. The playlist management information (PGRG) file corresponds to PGRG.MGR 803 of FIG. 8, and the playlist management table file 1010 corresponds to PGRG_INF.TBL 804 of FIG. 8. PGRG.MGR 1001 records the number of playlists registered through editing by the user (n playlists are shown in FIG. 10); and positional information of the playlist management table file PGRG_INF.TBL (for example, an offset in bytes from the top of the playlist management table file 1010 (PGRG_INF.TBL)) which records the contents of playlist #1, playlist #2, . . . , playlist #n−1, and playlist #n.

The playlist management table file 1010 records information for managing each of playlists #1, . . . , #n−1, and #n in tabular form. The configuration of playlist #n−1 is shown as a detailed example of the playlist management table 1010 of FIG. 10. Information recorded in playlist #n−1 includes: a creation time 1011 (time when the user generated playlist #n−1 by operating the apparatus); a name 1012; thumbnail information 1013; resume information 1017; number of pieces of program information 1018 indicating the original program information (OPGR) or user-defined program information (UPGR) registered in playlist #n−1; and a list of registered program numbers (PGR information or determination of OPGR or UPGR as previously mentioned, i.e., OPGR with the PGR number (hexadecimal) of 7FFF or less or UPGR with the PGR number of 8000 or more).

Since the creation time 1011 of playlists is recorded as management information, it is possible to display a list of playlists in order of creation time at the time of playback.

The thumbnail information 1013 of FIG. 10 is composed of thumbnail format information 1014 (whether contents protection is necessary or not, whether it is necessary to generate a thumbnail to be displayed based on reference positions of images of a recorded AV stream, whether thumbnail data registered in an external file is to be referenced, etc.), thumbnail positional information 1015 for displaying as a thumbnail in the AV stream, and positional information of external thumbnail file 1016. The thumbnail positional information 1015 is composed of the program information (PGR) number to be displayed as a thumbnail, the ALU number of AV stream corresponding to the PGR number, and the RP number in the ALU number.

Information recorded in the resume information 1017 includes: the program (PGR) number (OPGR with the PGR number of 7FFF or less or UPGR with the PGR number of 8000 or more) at the stop time of playback of playlist #n−1; the ALU number at the stop time of playback for the PGR number; and the RP number at the stop time of playback for the ALU number. This makes it possible to record and manage individual original program information or resume information for each user-defined playlist, like resume information 1017, in addition to the system resume information 902 shown in FIG. 9. Therefore, it is possible to perform playback control at a resume point for each original program, as a Resume Playback function at the time of playback, and provide a Resume Playback control function, for example, recognize the number of user-defined integrated information (UDFF) at which playback was stopped according to the last playback stop condition.

Figure 11:
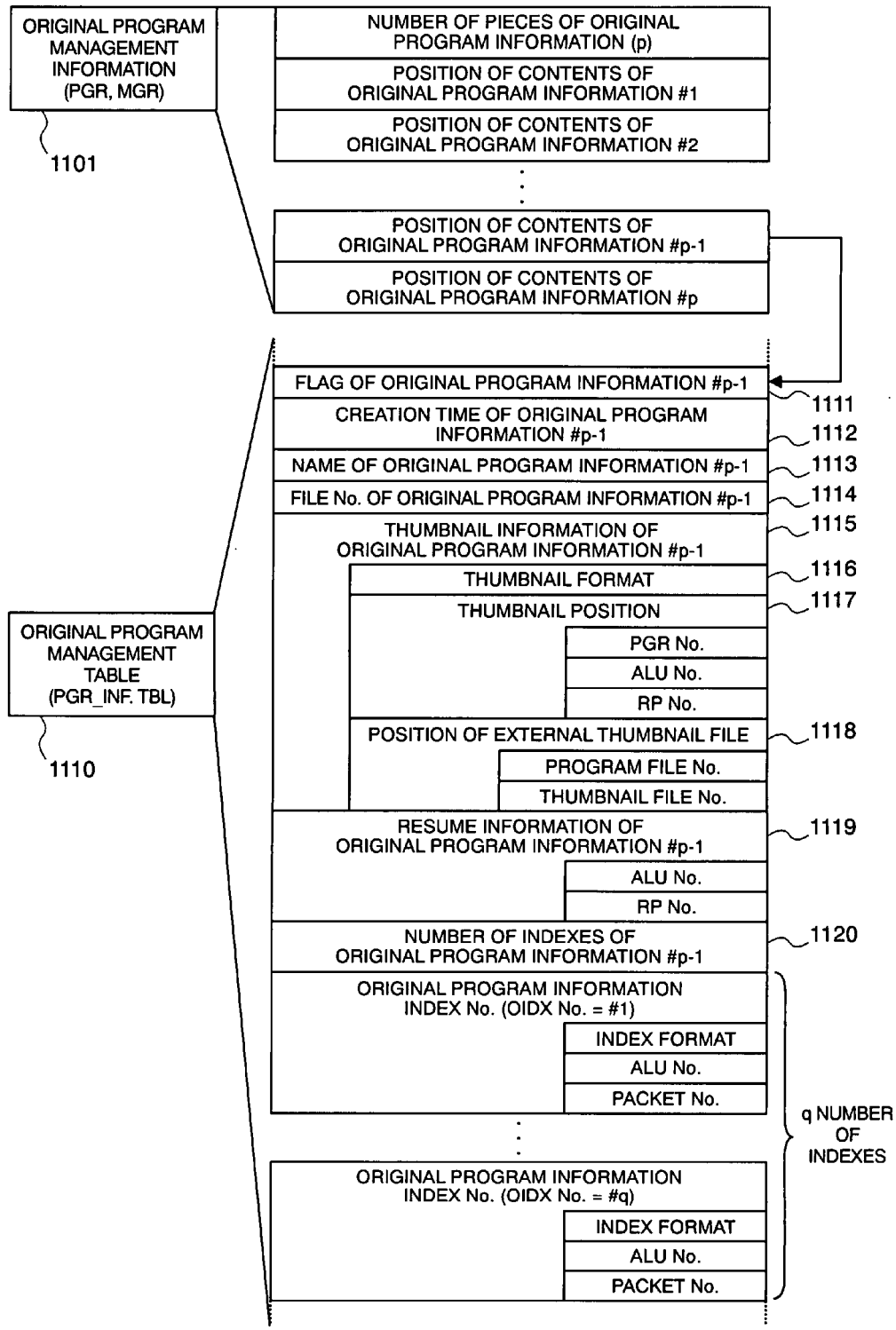
FIG. 11 is a diagram showing a configuration of original program management information and an example management table.

FIG. 11 shows the contents of an original program management information (OPGR) file 1101 and an original program management table file 1110. The user can play back the entire AV data recorded on the recording medium by performing playback based on the entire original program information on the recording medium. The original program management information (OPGR) file 1101 corresponds to PGR.MGR 805 of FIG. 8, and the original program management table file 1110 corresponds to PGR_INF.TBL 806 of FIG. 8. Information recorded in the original program management information file 1101 includes: the number of original programs recorded on the recording medium (p programs are shown in FIG. 11); and positional information in the original program management table file 1110 (for example, an offset in bytes from the top of the original program information management table file 1110 (PGR_INF.TBL)) which records the contents of original program information #1, original program information #2, . . . , original program information #n−1, and original program information #n.

A table portion of playlist #p−1 is shown as a detailed example of the original program management table 1110 of FIG. 11. Information arranged in playlist #p−1 includes: a program information flag 1111 including whether present original program information #p−1 is valid or not, copy control information (hereafter referred to as CCI), etc.; a creation time 1112 (time when original program information #p−1 was generated through recording operation of the apparatus by the user); a name 1113; a thumbnail file number 1114 (xxxx of PROGxxxx.AVS 821 shown in FIG. 8); thumbnail information 1115; resume information 1119; the number of indexes 1120; and a format, the ALU number of AV stream corresponding to program information #p−1 indicating the location of index, and the RP number of a position with index specification in the ALU for each index number. An index is positional information used when the user edits a program corresponding to original program information #p−1 to specify a marking point. Once an index is specified through editing, the user can perform various operations, for example, quickly skip the program corresponding to original program information #p−1 to a position specified with the index during playback. Components of the thumbnail information 1115, i.e., a thumbnail format 1116, a thumbnail position 1117, and a position of thumbnail external file 1118, are based on the same data structure as that for components of the playlist management table 1010, i.e., the thumbnail format 1014, the thumbnail position 1015, and the position of thumbnail external file 1016 of FIG. 10. Furthermore, components of the resume information 1119 are the same as those of the resume information 1017 of FIG. 10.

Figure 12:
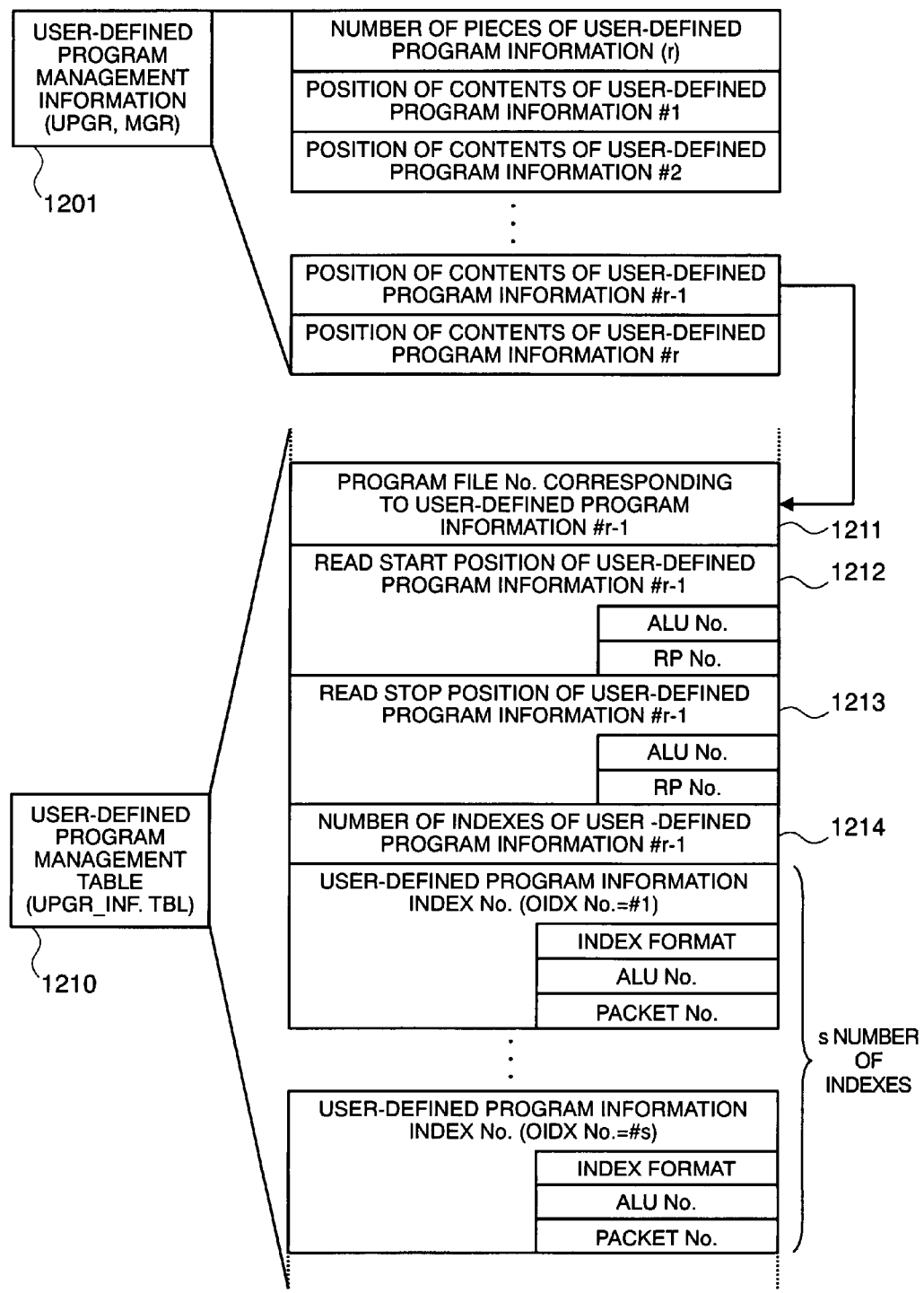
FIG. 12 is a diagram showing a configuration of user-defined program information and an example management table.

FIG. 12 shows the contents of a user-defined program management information (UPGR) file 1201 and a user-defined program management table file 1210. The user-defined program management information (UPGR) file 1201 corresponds to UPGR.MGR 807 of FIG. 8, and the user-defined program management table file 1210 corresponds to UPGR_INF.TBL808 of FIG. 8. Information recorded in the user-defined program management information file 1201 includes: the number of the user-defined programs registered through editing by the user (r programs are shown in FIG. 12); and positional information in the user-defined program management table file 1210 (for example, an offset in bytes from the top of the user-defined program management table file 1210 (UPGR_INF.TBL)) which records the contents of user-defined program information #1, user-defined program information #2, . . . , user-defined program information #r−1, and user-defined program information #r.

A table portion of user-defined program #r−1 is shown as a detailed example of the user-defined program management table 1210 of FIG. 12. Information arranged in user-defined program #r−1 includes: a file number 1211 (xxxx of PROGxxxx.AVS 821 shown in FIG. 8) of a program related to the present user-defined information; a read start position 1212 (including the ALU number and RP number in AV stream) of AV stream of the above-mentioned file number, specified as user-defined program information; a read end position 1213; the number of indexes 1214; and a format, the ALU number of AV stream corresponding to user-defined program information #r−1 indicating the location of index, and the RP number of a position with index specification in the ALU for each index number. Like the original program information of FIG. 11, an index is positional information used when the user edits a program corresponding to user-defined program information #r-1 to specify a marking point. Once an index is specified, the user can perform various operations, for example, quickly skip the program corresponding to original program information #p-1 to a position specified with the index during playback.

Figure 13:
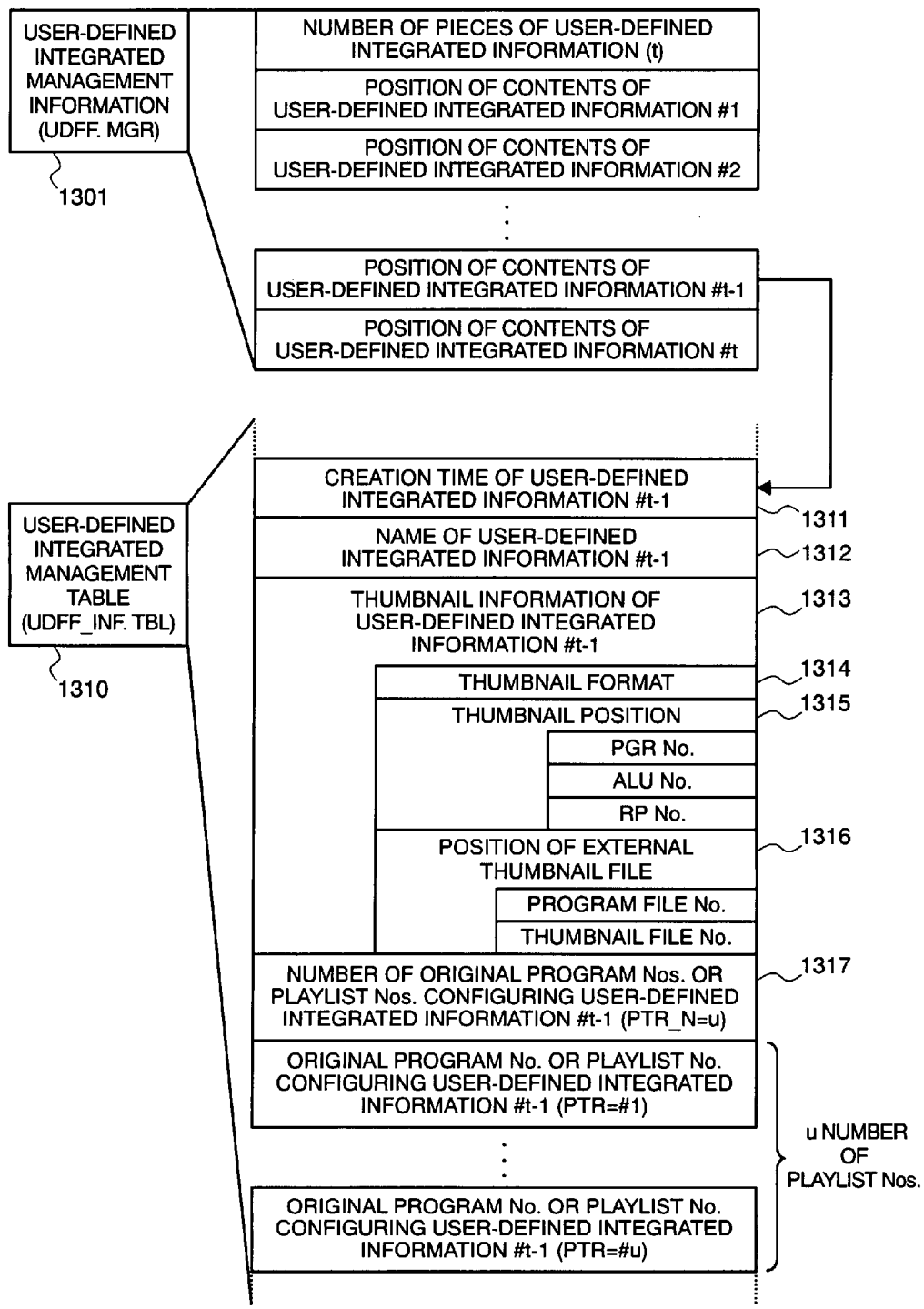
FIG. 13 is a diagram showing a configuration of user-defined integrated management information and an example management table.

FIG. 13 shows the contents of a user-defined integrated management information (UDFF) file 1301 and a user-defined integrated management table file 1310. The user-defined integrated management information (UDFF) file 1301 corresponds to UDFF.MGR 809 of FIG. 8, and the user-defined integrated management table file 1310 corresponds to UDFF_INF.TBL810 of FIG. 8. Information recorded in the user-defined integrated management information file 1301 includes: the number of pieces of user-defined integrated information registered through editing by the user (t pieces of information are shown in FIG. 13); and positional information in the user-defined integrated information table file 1310 (for example, an offset in bytes from the top of the user-defined integrated management table file 1310 (UDFFINF.TBL)) which records the contents of user-defined integrated information #1, user-defined integrated information #2, . . . , user-defined integrated information #t-1, and user-defined integrated information #t.

A table portion of user-defined integrated information #t-1 is shown as a detailed example of the user-defined integrated management table 1310 of FIG. 13. User-defined integrated information #t-1 is composed of a creation time 1311 at which the present user-defined integrated information was generated, a name 1312 of the present user-defined integrated information, thumbnail information 1313 representing the present user-defined integrated information, an original program number or number of play list numbers 1317 constituting the present user-defined integrated information, and subsequently an enumeration of original program numbers or playlist numbers constituting the present user-defined integration.

Components of the thumbnail information 1313, i.e., a thumbnail format 1314, a thumbnail position 1315, and a position of thumbnail external file 1316, are based on the same data structure as that for components of the playlist management table 1010, i.e., the thumbnail format 1014, the thumbnail position 1015, and the position of thumbnail external file 1016 of FIG. 10.

Figure 16:
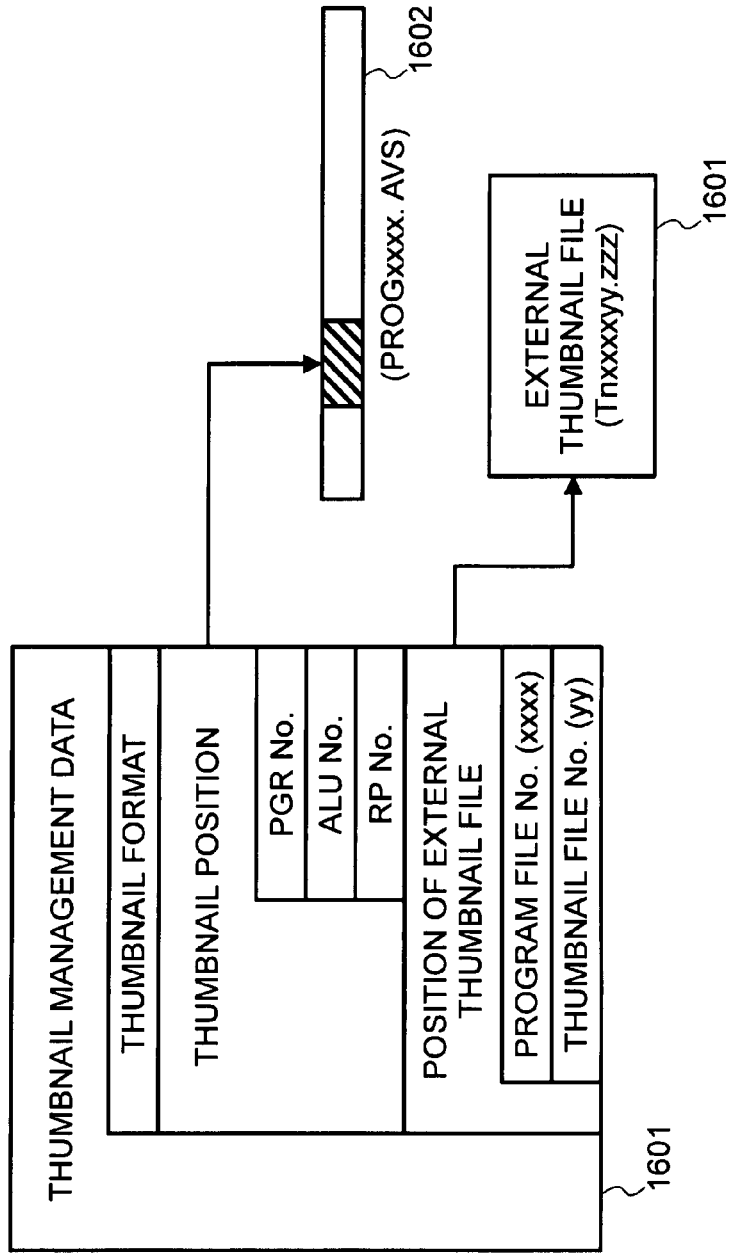
FIG. 16 is a diagram showing thumbnail management information.

FIG. 16 is a diagram showing a correlation between the structure of thumbnail management data and an external thumbnail file. In FIG. 16, thumbnail managed data 1601 is composed of a thumbnail format, a thumbnail position, and a position of thumbnail external file, like the thumbnail information 1013 of FIG. 10, the thumbnail information 1115 of FIG. 11, and the thumbnail information 1313 of FIG. 13. The thumbnail position is composed of the program information (PGR) number of a program file 1602, the ALU number corresponding to the position of AV stream to be displayed as a thumbnail, and the RP number in ALU corresponding to the ALU number. The thumbnail external file information is composed of a program file number xxxx and a thumbnail file number yy.

Figure 17:
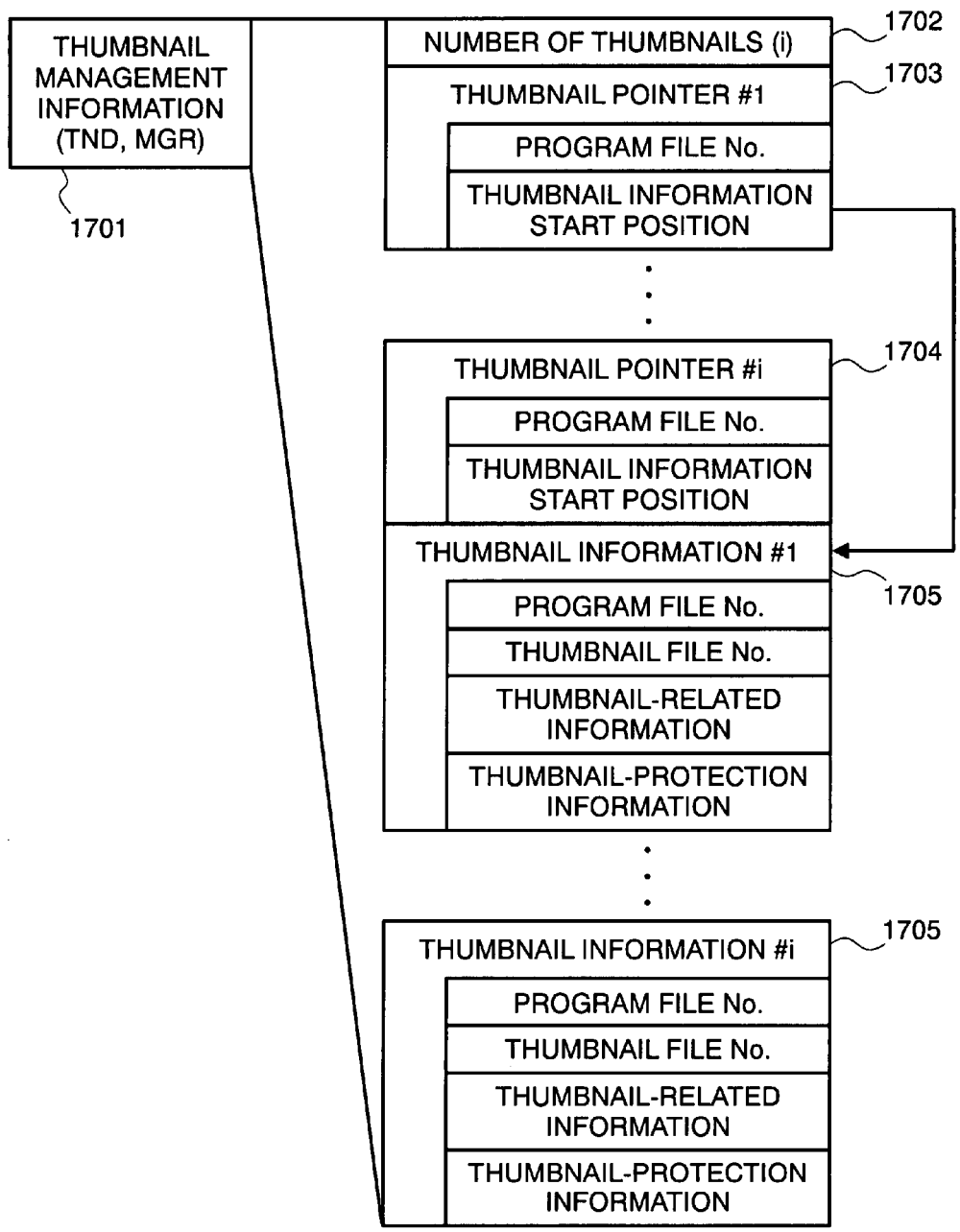
FIG. 17 is a diagram showing a configuration of management information integrating thumbnails and a management table.

FIG. 17 shows a structure of a total thumbnail management information file 1701 which corresponds to TND.MGR 831 of FIG. 8. Information for integrating thumbnails is composed of the number of registered thumbnails 1702 (i thumbnails are shown in FIG. 17), thumbnail pointers 1703 to 1704 having pointer values of locations where information for registered number of thumbnails is stored, and subsequently thumbnail information 1705 to 1706. Each piece of thumbnail information 1705 to 1706 is composed of a program file number, a thumbnail file number, thumbnail-related information (vertical and horizontal pixel sizes of thumbnail, compression method, etc.), and thumbnail protection information (whether encryption of thumbnail is possible or not). If thumbnail information is collected in one location in this manner, total thumbnail information can be grasped only by referencing the present total thumbnail management information file 1701, providing high-speed operation when obtaining thumbnail information list with a playback apparatus according to the present invention.

Figure 15:
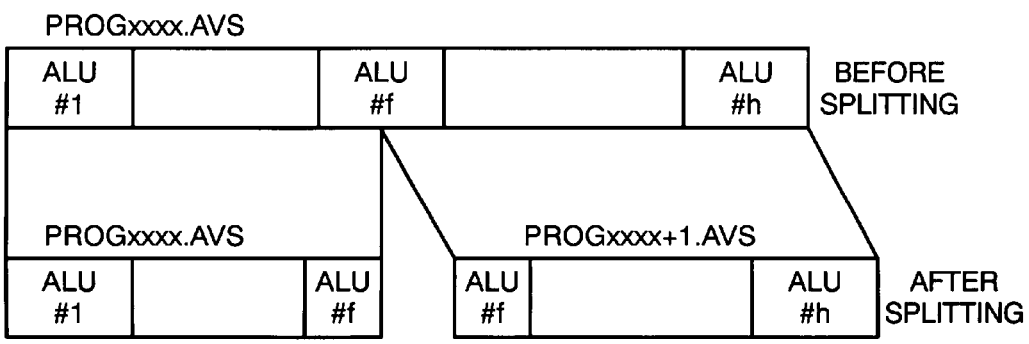
FIG. 15 is a diagram showing processing at the time of splitting an AV stream file.

FIG. 15 is a schematic diagram showing how program files storing AV stream are managed when the user splits a program into two through editing operations (for example, when splitting a recorded program into two). As shown in FIG. 15, AV streams of files PROGxxxx.AVS are arranged in units of ALU. Therefore, although file splitting in units of ALU is simple, the ALU unit accounts for several ten seconds of playback time of recorded AV streams, resulting in a very low splitting accuracy. In order to overcome this, splitting in units of RP will be enabled at a splitting point. In this case, splitting is made at ALU number #f, as shown in FIG. 15. An AV stream of ALU#1 to ALU#f of a split file will be recorded as PROGxxxx.AVS, and an AV stream of ALU#f to ALU#h as PROGxxxx+1.AVS (file number xxxx is incremented by one). In this case, the ALU value at the end of stream of PROGxxxx.AVS after splitting is not predetermined 8192RP (shown in FIG. 14). Therefore, "Number of program ALUs", which is a parameter of the ALU management information 1403 of FIG. 14, is changed and at the same time "Number of RPs in last ALU" is changed to the number of RPs after splitting, i.e., the number of RPs before the splitting point at ALU#f to update file PROGxxxx.AVS. Furthermore, also with AV stream after splitting, PROGxxxx+1.AVS (FIG. 15), "Number of program ALUs", which is a parameter of the ALU management information 1403 of FIG. 14, is changed and at the same time "Number of RPs in first ALU" is changed to the number of RPs after splitting, i.e., the number of RPs after the splitting point at ALU#f. This measure improves the accuracy of the splitting point. At least in the case of AV stream with MPEG compression, a file can be split with accuracy in unit of GOP (Group Of Picture).

With a recording and playback apparatus according to the present invention, ease of use will be improved. For example, effects of improved ease of use will be explained below.

Since the user can selectively manage any desired playlists or playback ranges, it is possible to manage favorite contents to be played back for each user improving the ease of use, even in a case when a single recording medium is shared by a plurality of users. In addition, playlists are managed in integrated manner and therefore the user can arbitrarily change the display order of playlists.

Furthermore, the user can also play back from a resume point for playing back a program or playlist regardless of the playback condition, such as playlist playback, program playback, etc.

Furthermore, when the user performs desired Navigation Display, the playback apparatus can display a list of thumbnails at high speed.

What is claimed is:
1. A method for recording a program, a thumbnail related to the program and management information for managing the program and the thumbnail, the method comprising steps of:
  recording the program on a recording medium;
  recording the thumbnail on the recording medium; and
  recording the management information on the recording medium,
  wherein the management information includes:

original program information (OPGR) which indicates whole playback range of the program;

user defined program information (UPGR) which indicates whole or a part of a playback range of the program;

playlist information (PGRG) which indicates a playback order of the OPGR or the UPGR;

user defined integrated information (UDFF) which includes at least one of the OPGR and the PGRG;

OPGR management table file (PGR_INF.TBL) about the OPGR;

PGRG management table file (PGRG_INF.TBL) about the PGRG;

UDFF management table file (UDFF_INF.TBL) about the UDFF; and external thumbnail file which has a plurality of thumbnail files for navigation, wherein:

each of said OPGR management table file (PGR_INF.TBL), PGRG management table file (PGRG_INF.TBL) and UDFF management table file (UDFF_INF.TBL) has thumbnail management data, the management information further includes thumbnail management information file (TND.MGR) in addition to the thumbnail management data, the thumbnail management information file (TND.MGR) being for management of a plurality of thumbnails together, and the thumbnail management information file (TND.MGR) manages the thumbnail management data of said OPGR management table file (PGR_INF.TBL), PGRG management table file (PGRG_INF.TBL) and UDFF management table file (UDFF_INF.TBL) together and includes a portion of a file name of the external thumbnail file.

2. A recording apparatus for recording a program and management information for managing the program, the recording apparatus comprising:

a storage part which records the program and the management information; and a controller which controls the storage part, wherein the management information includes:

original program information (OPGR) which indicates whole playback range of the program;

user defined program information (UPGR) which indicates whole or a part of a playback range of the program;

playlist information (PGRG) which indicates a playback order of the OPGR or the UPGR;

user defined integrated information (UDFF) which includes at least one of the OPGR and the PGRG;

OPGR management table file (PGR_INF.TBL) about the OPGR;

PGRG management table file (PGRG_INF.TBL) about the PGRG;

UDFF management table file (UDFF_INF.TBL) about the UDFF; and external thumbnail file which has a plurality of thumbnail files for navigation, wherein:

each of said OPGR management table file (PGR_INF.TBL), PGRG management table file (PGRG_INF.TBL) and UDFF management table file (UDFF_INF.TBL) has thumbnail management data, the management information further includes thumbnail management information file (TND.MGR) in addition to the thumbnail management data, and the thumbnail management information file (TND.MGR) being for management of a plurality of thumbnails together, and the thumbnail management information file (TND.MGR) manages the thumbnail management data of said OPGR management table file (PGR_INF.TBL), PGRG management table file (PGRG_INF.TBL) and UDFF management table file (UDFF_INF.TBL) together and includes a portion of a file name of the external thumbnail file.

* * * * *